United States Patent [19]

Yamamoto et al.

[11] Patent Number: 5,231,144
[45] Date of Patent: Jul. 27, 1993

[54] HIGHLY CRYSTALLINE POLYPROPYLENE FOR FORMING FILM

[75] Inventors: Yoshiharu Yamamoto; Hajime Mizuno; Kenji Yamamoto; Hideo Sakurai, all of Yokkaichi, Japan

[73] Assignee: Mitsubishi Petrochemical Company Limited, Tokyo, Japan

[21] Appl. No.: 828,610

[22] Filed: Jan. 31, 1992

[30] Foreign Application Priority Data

Feb. 1, 1991 [JP] Japan .................................. 3-12177

[51] Int. Cl.$^5$ .......................... C08F 8/00; C08F 10/00; C08F 110/00
[52] U.S. Cl. ................................. 525/333.8; 526/351
[58] Field of Search .................... 526/351; 525/333.8

[56] References Cited

U.S. PATENT DOCUMENTS 3,962,157  6/1976  Nakano et al. ..................... 526/351
4,724,225  2/1988  Shimizu et al. ..................... 526/901
4,972,034  11/1990  Matsuura et al. .................... 526/351

*Primary Examiner*—Joseph L. Schofer
*Assistant Examiner*—David Wu
*Attorney, Agent, or Firm*—Oblon, Spivak, McClelland, Maier & Neustadt

[57] ABSTRACT

A highly crystalline polypropylene for forming film which is obtained by subjecting to the molecular weight degradation a propylene homopolymer obtained by the polymerization of propylene over a stereoregulating catalyst and which has:

(a) a melt flow rate, MFR, in the range of 1 to 10 min determined in accordance with ASTM-D-1238;
(b) a ratio Q which is the ratio of weight average molecular weight $M_W$ to the number average molecular weight $M_N$, namely, $M_W/M_N$, in the range of 2.5 to 4.0;
(c) a density of at least 0.9070 g/cm$^3$ or more;
(d) the cold xylene soluble matter (CXS) in the range of 2.5% by weight at the highest.

The highly crystalline polypropylene will produce film endowed with good transparency, stiffness, impact strength and resistance to blocking, in improved cost performance, which could to some extent be antagonistic to each other.

15 Claims, No Drawings

HIGHLY CRYSTALLINE POLYPROPYLENE FOR FORMING FILM

BACKGROUND OF THE INVENTION

The present invention relates to highly crystalline polypropylene resins which are suitable for forming film excellent in transparency, stiffness, impact strength and resistance to blocking.

Hitherto, polypropylene resins have been widely used in the packaging field of food packaging, fiber packaging and the like because of their excellent optical properties, mechanical properties and packaging applicabilities.

As the polypropylene film to be used in the packaging field, a polypropylene having an MFR, Melt Flow Rate, in the range of 1 to 10 g/10 min has hitherto been used in consideration of its moldability. The polypropylene polymerized with a titanium trichloride catalyst was, however, disadvantageous in insufficient transparency of film because of its large or broad Q value such as 5 to 6.

Furthermore, the polypropylene of MFR of 1 to 10 has generally a density as an index of stiffness (what is called nerve) smaller than 0.907 g/cm$^3$, and has a tendency to have wider molecular weight distribution if polymerization is carried out with a stereoregularity improver for increasing the density. It was therefore very hard to realize both the decrease of the Q value and the increase of the density at the same time.

On the other hand, when a highly active catalyst supported on a magnesium chloride carrier is used, a polypropylene having a narrow molecular weight distribution is obtained. It has, however, a Q value in the range of 4 to 5 which is still insufficient for the improvement of its transparency. Also, it has a density still remaining in the range of less than 0.907 g/cm$^3$ which cannot be said satisfactory also from the viewpoint of stiffness.

Furthermore, low molecular weight and/or low crystalline polymers in polypropylene (which is a cold xylene soluble matter CXS) which deteriorate the blocking tendency of film were present in large amounts in polypropylenes produced by either of the catalysts used, so that a polypropylene having, in addition to the above-described properties, a small CXS was desired.

Moreover, polypropylene resins which have hitherto been well-known were unsatisfactory in some applications in the balance of stiffness, impact strength and production cost. For instance, for the purpose of improving the stiffness of polypropylene, methods for broadening the molecular weight distribution (Japanese Patent Laid-Open Publication Nos. 2307/1981, 172507/1984 and 195007/1987) and methods comprising adding a nucleating agent to polypropylene (Japanese Patent Publication No. 1809/1964 and Japanese Patent Laid Open Publication No. 139731/1985) have been proposed, but these methods are not desirable because they work for unduly decreasing impact strength notwithstanding the improvement of stiffness.

For the purpose of improving the impact strength, methods comprising copolymerizing with propylene a comonomer such as ethylene or the like (Japanese Patent Publication No. 11230/1968 and Japanese Patent Laid Open Publication No. 35788/1978) and methods comprising blending with polypropylene an ethylene polypropylene random copolymer or an ethylene-butene random copolymer (Japanese Patent Laid-Open Publication No. 43242/1990) have also been proposed. These techniques, however, were disadvantageous in their restricted applications because not only the stiffness of the propylene resin is lowered but also the production cost of film is raised.

As the method for improving the impact strength of polypropylene, there is also known a method for narrowing the molecular weight distribution comprising molecular weight degradation in the course of granulation of a polymer powder obtained by polymerization. However, in the film field, polypropylene is generally required to still have an MFR in the range of 1 to 10 g/10 min even after the molecular weight degradation, and the narrowing of the molecular weight distribution by molecular weight degradation was restricted.

SUMMARY OF THE INVENTION

The object of the present invention is to provide a polypropylene film having improved transparency, stiffness, impact strength and resistance to blocking.

As a result of researches, the present inventors have found that a highly crystalline polypropylene for forming film improved in transparency, stiffness, impact strength and resistance to blocking is obtained by controlling the fluidity of, the molecular weight distribution of, the density of and the cold xylene soluble matter in polypropylene to special ranges, resulting in the present invention.

Accordingly, the highly crystalline polypropylene for forming film according to the present invention comprises a polypropylene which is obtained by subjecting to the molecular weight degradation a propylene homopolymer obtained by the polymerization of propylene over a stereoregulating catalyst and which has:

(a) a melt flow rate, MFR, in the range of 1 to 10 g/10 min determined in accordance with ASTM-D-1238;

(b) a ratio Q which is the ratio of weight average molecular weight $M_W$ to the number average molecular weight $M_N$, namely, $M_W/M_N$ in the range of 2.5 to 4.0;

(c) a density of at least 0.9070 g/cm$^3$; and (d) the cold xylene soluble matter, CXS, of 2.5% by weight at the highest.

The polypropylene in accordance with the present invention is excellent in transparency, stiffness, impact strength and resistance to blocking.

DETAILED DESCRIPTION OF THE INVENTION

Polypropylene of the Present Invention (1)

The highly crystalline polypropylene for forming film according to the present invention is the one having the properties which have been described above and are described in detail below.

Preparation of Polypropylene of the Present Invention

The highly crystalline polypropylene for forming film according to the present invention can be prepared by the homopolymerization of propylene in the presence of a highly stereoregulating catalyst and next by the molecular weight degradation.

As the highly stereoregulating catalyst, a catalyst comprising a solid catalyst component (A) having as the essential components magnesium, titanium, a halogen and an electron donor combined with an organoaluminum compound component (B) is particularly preferred for the preparation of the highly crystalline polypropylene having a narrow molecular weight distribution as a stock for molecular weight degradation in accordance with the present invention.

(1) Catalyst (A) Solid catalyst component

The solid catalyst component comprises as the essential components magnesium, titanium, a halogen and an electron donor. The term "comprise" herein used includes, in addition to a system which is made of only the aforementioned four essential components, a system which is made of these four components and another component.

Examples of the magnesium compounds to be used as the magnesium source include magnesium dihalides, dialkoxymagnesiums, alkoxymagnesium halides, magnesium oxyhalides, dialkyl magnesiums and the like. Among these magnesium compounds, the magnesium dihalides are preferred, and magnesium dichloride is particularly preferred.

As the titanium compounds as the titanium source, there are mentioned tetravalent titanium compounds containing an alkoxy group (of e.g. 1-8 carbon atoms) and/or a halogen group such as chlorine. Specific examples of the titanium compounds include $TiCl_4$, $TiBr_4$, $Ti(On-C_4H_9)_4$, $Ti(Oi-C_4H_9)_4$, $Ti(On-C_4H_9)_2Cl_2$ and the like. Preferable examples are $TiCl_4$ and $Ti(On-C_4H_9)_4$.

As the halogen source, the halogen is generally supplied from the aforementioned magnesium or titanium halide compounds used, but it can be also supplied from the well-known halogenating agents such as aluminum halides, silicon halides or phosphorus halides. The halogen contained in the catalyst components is fluorine, chlorine, bromine, iodine or a mixture thereof, and most preferably chlorine.

Examples of the electron donor, include (a) organic acid ester, (b) organic acid halides and (c) organosilicon compounds.

The organic acid esters (a) include preferably aromatic carboxylic acid esters (of e.g. 1-8 carbon atoms in the alkyl group) such as ethyl benzoate, ethyl anisate, diethyl phthalate, dibutyl phthalate or diheptyl phthalate.

The organic acid halides (b) include preferably aromatic carboxylic acid halides such as benzoyl chloride, toluyl chloride, phthaloyl chloride or isophthaloyl chloride.

As the organosilicon compound (c), preferable are compounds having the bond Si-O-C, more preferably compounds represented by the formula $R^1R^2_{3-n}Si(OR^3)_n$, wherein $R^1$ represents a branched aliphatic hydrocarbyl group or an alicyclic hyrocarbyl group of about 3 to 12 carbon atoms, preferably an aliphatic or alicyclic hydrocarbyl group having 3 to 10 carbon atoms, having a branch at the α-position and thus having a secondary or tertiary carbon atom at the α-position, more preferably a branched aliphatic hydrocarbyl group of 4 to 10 carbon atoms having a tertiary carbon atom at the α-position, $R^2$, which is the same as or different form $R^1$, represents a hydrocarbyl group having about 3 to 12 carbon atoms, $R^3$ represents a hydrocarbyl group having 1 to 4 carbon atoms, and n denotes a number of $1 \leq n \leq 3$, preferably n being 2 or 3.

Specific examples of the organosilicon compound include:
$(CH_3)_3CSi(CH_3)(OCH_3)_2$,
$(CH_3)_3CSi(CH(CH_3)_2)(OCH_3)_2$,
$(CH_3)_3CSi(CH_3)(OC_2H_5)_2$,
$(C_2H_5)_3CSi(CH_3)(OCH_3)_2$,
$(CH_3)(C_2H_5)CHSi(CH_3)(OCH_3)_2$,
$((CH_3)_2CHCH_2)_2Si(OCH_3)_2$,
$(C_2H_5)(CH_3)_2CSi(CH_3)(OCH_3)_2$,
$(C_2H_5)(CH_3)_2CSi(CH_3)(OC_2H_5)_2$,
$(CH_3)_3CSi(OCH_3)_3$,
$(CH_3)_3CSi(OC_2H_5)_3$,
$(C_2H_5)_3CSi(OC_2H_5)_3$,
$(C_2H_5)(CH_3)_2CSi(OC_2H_5)_3$,

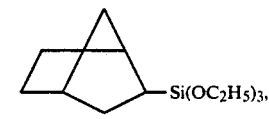

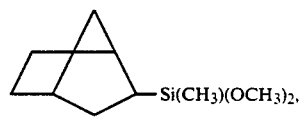

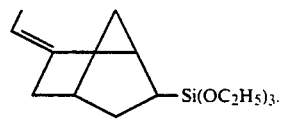

These electron donor compounds can be used alone or in combination of the two or more. Among them, combinations of the organic acid ester and the organosilicon compound or of the organic acid halide and the organosilicon compound are preferred. These combinations can be used at the same time or in the separate processes.

The amounts of the aforementioned components used are optional as far as the effect of the present invention is attainable but preferably in the following ranges.

The amount of the titanium compound used may be in the range of $1 \times 10^{-4}$ to 1000, preferably in the range of 0.01 to 10 by mole in proportion to the amount of the magnesium compound to be used. When the titanium compound is used as the halogen source, it may be used in an amount of $1 \times 10^{-4}$ to 1000, preferably in the range of 0.1 to 100 by mole, in proportion to the amount of the magnesium compound to be used, irrespective of whether the titanium compound and/or the magnesium compound contain a halogen or not.

The amounts of silicon, aluminum and boron compounds which can be used in the solid catalyst component may be in the range of $1 \times 10^{-3}$ to 100 in proportion to the aforementioned magnesium compound used, preferably in the range of 0.01 to 1.

The amount of the electron donor compound used may be in the range of $1 \times 10^{-3}$ to 10 by mole, preferably in the range of 0.01 to 5, in proportion to the aforementioned magnesium compound used.

The solid catalyst component is prepared from the aforementioned components by the following preparation methods, for example.

(a) A method comprising contacting the magnesium halide and if necessary the electron donor compound and the titanium-containing compound.

(b) A method comprising treating alumina or magnesia with a phosphorus halide compound, which is next brought into contact with the magnesium halide, the electron donor compound and the halogen containing titanium compound.

(c) A method comprising a solid component obtained by contacting the magnesium halide, a titanium tetraalkoxide and a specific polymeric silicon compound into contact with a titanium halide and/or a silicon halide compound. The polymeric silicon compound is preferably represented by the following formula,

wherein R represents a hydrocarbyl group having about 1 to 10 carbon atoms, and n denotes the polymerization degree so that the polymeric silicon compound has a viscosity in the range of about 1 to 100 cSt.

Specific examples of the polysiloxanes include methyl hydrogen polysiloxane, ethyl hydrogen polysiloxane, phenyl hydrogen polysiloxane, cyclohexyl hydrogen polysiloxane, 1,3,5,7-tetramethylcyclotetrasiloxane or 1,3,5,7,9-pentamethylcyclopentasiloxane are preferred.

(d) A method comprising bringing a solid component obtained by dissolving the magnesium compound into a titanium tetraalkoxide and an electron donor compound and crystallizing it with a halogenating agent or a titanium halide compound into contact with a titanium compound.

(e) A method comprising reacting an organomagnesium compound such as Grignard reagent with a halogenating agent, a reducing agent or the like and then, if necessary, brining it into contact with an electron donor compound and a titanium compound.

(f) A method comprising bringing an alkoxymagnesium compound into contact with a halogenating agent and/or a titanium compound in the presence or absence of an electron donor compound.

Among the aforementioned methods for preparing the solid catalyst components, the method (a) or (c) is preferred.

(B) Organoaluminum compound component

Examples of organoaluminum compound used in combination with the solid catalyst component in the highly stereoregulating catalysts include (a) trialkylaluminums such as triethylaluminum, triisobutylaluminum, trihexylaluminum and the like, (b) alkylaluminum halides such as diethylaluminum monochloride, diisobutylaluminum monochloride, ethylaluminum sesquichloride and the like, (c) alkylaluminum alkoxides such as diethylaluminum ethoxide, diethylaluminum phenoxide and the like. Among these organoaluminum compounds, trialkylaluminums are preferred.

(C) Electron donor/external donor

The highly stereoregulating catalyst comprises the solid catalyst component described above and the organoaluminum compound component in combination. In this connection, the term "comprises . . . in combination" indicates that any appropriate components in addition to the above-described two components can be used in combination.

Typical examples of such appropriate components include electron donors, which are called "external donor" in contrast with those used for the preparation of the solid catalyst components which are called "internal donors".

In the present invention, such electron donors can also be present in polymerization systems. Specific examples of the electron donors as the external donor can be found in the examples of the internal donors mentioned herein above, and the external electron donors for use in the present invention are most preferably the organosilicon compounds, specific examples of which are as described above.

(2) Polymerization

Homopolymerization of propylene is carried out over a catalyst comprising combination of the above-described solid catalyst component and the organoaluminum compound component.

As the polymerization method, the so-called slurry polymerization method with an inert hydrocarbon such as hexane or heptane used as a solvent, the liquid phase polymerization method with liquid propylene used as a solvent and the vapor phase polymerization method can be used.

Polymerization is generally carried out at a temperature in the range of about 20° to 150° C., preferably 40° to 100° C. and at a polymerization pressure in the range of atmospheric pressure to 50 atmospheric pressures. The molecular weight of the propylene polymer may be controlled by the use of hydrogen.

(3) Molecular weight degradation

The polymer obtained by the above-described method may be subjected to molecular weight degradation where the polymer is kneaded when it is molten in the presence of a radical generating agent to give polypropylene having a predetermined molecular weight distribution.

The radical generating agent generally used for the molecular weight degradation may be organic or inorganic and includes organic peroxides such as a peroxide, a hydroperoxide or a peracid. The organic peroxides may be liquid, solid or in the form solidified with an inorganic filler and are generally blended with polypropylene at a temperature where these organic peroxides are not substantially decomposed.

The organic peroxides which can be used are preferably selected from those of a temperature of 70° to 300° C. for obtaining a half-life period of 1 minute. Examples of such organic peroxides include (i) hydroperoxides such as t-butyl hydroperoxide, cumene hydroperoxide and the like; (ii) dialkyl peroxides such as dicumyl peroxide, 2,5-dimethyl-di(t-butyl peroxy)hexane, 2,5-dimethyl-2,5-di(t-butyl peroxy) hexyne-3 and the like; (iii) diacyl peroxides such as lauroyl peroxide, benzoyl peroxide and the like; (iv) peroxy esters such as t-butyl peroxyacetate, t-butyl peroxylaurate and the like; (v) ketone peroxides such as methyl ethyl ketone peroxide, methyl isobutyl ketone peroxide and the like.

The amount of the radical generating agent added is an important factor for determining the MFR of polypropylene. It is in an amount of about 0.001 to 2% by weight, preferably about 0.01 to 0.5% by weight of polypropylene. If it is too small, the effect of the addition may not be exhibited, and if it is excessive, its decomposition is excessive, both undesirable. Accordingly, it is preferred to control the amount added in consideration of the MFRs before and after the degradation of polypropylene.

When polypropylene and the radical generating agent are mixed in a predetermined proportion by dry blending for example in a supermixer and melt kneaded under a usual extrusion condition for example at a temperature of 170° C. to 300° C., depolymerization may then be easily accomplished. Alternatively, they may be directly added and melt kneaded.

The polypropylene according to the present invention can be incorporated with, in addition to the radical generating agent, various additives which can be incorporated with the polypropylene resin such as an antioxidant, an ultraviolet deterioration inhibitor, an antiblocking agent, a slip agent, an antistatic agent, a colorant or the like.

Polypropylene of the present invention (2)

The polypropylene according to the present invention satisfies the following conditions. (a) Melt flow rate (MFR)

The polypropylene according to the present invention has an MFR in the range of 1 to 10 g/10 min, preferably 2 to 8 g/10 min. If the MFR is below the above-described range, it is difficult to form film from such propylene, and if the MFR exceeds the above-described range, the transparency and the impact strength of film produced from such propylene may tend to be lowered.

(b) $M_W/M_N$ ratio, Q value

The polypropylene according to the present invention has a Q value in the range of 2.5 to 4.0, preferably 2.8 to 3.8. If the Q value is below the above-described range, it is difficult to form film from such propylene, and if the Q value exceeds the above-described range, the transparency and the impact strength of film produced from such polypropylene may tend to be lowered.

(c) Density

The polypropylene according to the present invention has a density of at least 0.9070 g/cm$^3$ and preferably up to 0.9150 g/cm$^3$, more preferably 0.9075 g/cm$^3$ to 0.9150 g/cm$^3$ If the density is below the above-described range, the "nerve" or stiffness of a film is weakened and thus the feature of the present invention is missed.

(d) Cold xylene soluble matter (CXS)

The polypropylene according to the present invention has a cold xylene soluble matter (CXS) in the range of 2.5% by weight or less, preferably 2.3% by weight or less. If the CXS exceeds the range, not only the "nerve" of a film is weakened but also the resistance to blocking is deteriorated.

The highly crystalline polypropylene of the present invention is a homopolymer of propylene and has a boiling n-heptane insoluble matter in an amount of 95% by weight or more.

Applications of Polypropylene of the Present Invention

The highly crystalline polypropylene of the present invention has excellent transparency, stiffness and impact strength, and is thus suitable for the applications of forming film, above all, production of packaging materials such as non-oriented film or inflated film by the T-die method.

EXAMPLES

The present invention is illustrated specifically by the following examples, but it should not be construed to be limited thereto. The MFR, the Q value, the density, the CXS, the haze, the Young's modulus, the impact strength at film punching and the resistance to blocking in examples and comparative examples were measured by the following methods.

MFR

It was measured in accordance with ASTM-D-1238.

Q value

It was obtained from the ratio of the weight average molecular weight and the number average molecular weight by the Gel Permeation Chromatography method.

CXS

A sample in an amount of 2 g was completely dissolved in 300 ml of boiling xylene and cooled to a temperature of 23° C. The weight of the xylene soluble matter was measured, and the ratio (%) of the weight of the xylene soluble matter to the total sample weight was expressed by CXS.

Density

It was measured in accordance with the JIS K7112 D method.

Film haze

It was measured with four layered films in accordance with ASTM D1003.

Film Young's modulus

It was measured in the MD direction of a film in accordance with ISO R1184.

Impact strength at film punching

It was measured with a film impact tester (TOYO SEIKI).

Resistance to blocking

Two sheets of film were piled so that they have a contact area of 10 cm$^2$. The sheets of film were inserted between two glass plates and left standing for 7 days under a load of 50 g/cm$^2$ at a temperature of 40° C. Resistance to blocking was expressed by the maximum load on peeling the film on a Schopper testing machine.

EXAMPLE 1

Production of the Solid Catalyst Component

Into a flask thoroughly purged with nitrogen was introduced 200 ml of dehydrated and deoxygenated n-heptane, followed by 0.4 mole of $MgCl_2$ and 0.8 mole of $Ti(O-nC_4H_9)_4$, and the reaction was conducted at 95° C. for 2 hours. After the reaction was completed, the reaction mixture was cooled to a temperature of 40° C. Then, 48 ml of methyl hydrogen polysiloxane (of a viscosity of 20 cSt) was introduced, and the mixture was further reacted for 3 hours. The resulting solid component was washed with n-heptane.

Next, into a flask thoroughly purged with nitrogen was introduced 50 ml of purified n-heptane, followed by the solid component synthesized above in an amount of 0.24 mole based on the Mg atom. Then, 0.4 mole of $SiCl_4$ mixed with 25 ml of n-heptane was introduced to the flask at 30° C. over a period of 60 minutes, and the mixture was reacted at 90° C. for 3 hours. Furthermore, 0.016 mole of phthalic acid chloride mixed with 25 ml of n-heptane was introduced into the flask at 90° C. over a period of 30 minutes, and the mixture was further reacted at 90° C. for 1 hour.

After the reaction was completed, the reaction mixture was washed with n-heptane. Then, 0.24 mmole of $SiCl_4$ was introduced and the mixture was reacted at 100° C. for 3 hours. After the reaction was completed, the reaction mixture was thoroughly washed with n-heptane Into a flask thoroughly purged with nitrogen were introduced 50 ml of thoroughly purified n-heptane and then 5 g of the solid component obtained above, and 0.81 ml of $(CH_3)_3CSi(CH_3)(OCH_3)_2$ was further introduced for the contact at 30° C. for 2 hours. After the contact was completed, the reaction mixture was thoroughly washed with n-heptane.

Production of Polypropylene

TABLE 1

| | Radical generating agent wt ppm | MFR (pellets) g/10 min | Q value | Density g/cm³ | CXS wt % | Haze (four sheets of film) % | Young's modulus kg/cm² | Impact strength at punching 23° C. kgcm/cm | Impact strength at punching 10° C. kgcm/cm | Formability (variation in film thickness) | Resistance to blocking g/10 cm² |
|---|---|---|---|---|---|---|---|---|---|---|---|
| Example 1 | 30 | 6.0 | 3.5 | 0.9085 | 1.1 | 6.7 | 9500 | 2200 | 550 | good | 130 |
| Example 2 | 50 | 7.8 | 3.2 | 0.9087 | 1.2 | 5.4 | 9300 | 2400 | 600 | good | 150 |
| Comparative Example 1 | 90 | 11.5 | 2.8 | 0.9088 | 1.4 | 4.9 | 8500 | 2500 | 680 | poor | 180 |
| Comparative Example 2 | 0 | 3.9 | 5.5 | 0.9083 | 1.0 | 15.9 | 10800 | 980 | 150 | good | 40 |
| Comparative Example 3 | 25 | 5.9 | 3.8 | 0.9050 | 3.1 | 8.3 | 8200 | 1800 | 350 | good | 650 |

Radical generating agent: 2.5-dimethyl-2.5-di(t-butylperoxy) hexyne-3

An autoclave equipped with a stirring means and having an internal volume of 200 liters was thoroughly purged with propylene, and 60 liters of dehydrated and deoxygenated n-heptane was introduced, and 15.0 g of triethylaluminum and 3.0 g of the aforementioned solid catalyst component were introduced at 75° C. under a propylene atmosphere. Furthermore, while the hydrogen concentration in the vapor phase was maintained at 1.5% by volume, propylene was fed at a feeding rate of 9 Kg/hr and the polymerization was further continued for 1.5 hours. The product was subjected to filtration and the solid product to drying, powdery polypropylene was then obtained in an amount of 34.5 kg. The polypropylene powder had an MFR of 3.5 g/10 min and a boiling n-heptane insoluble matter in an amount of 99.3% by weight.

To 100 parts by weight of the polypropylene were added a radical generating agent in an amount specified in Table 1, 0.15 part by weight of 2,6-di-t butyl-p-cresol as an antioxidant, 0.05 part by weight of calcium stearate as a neutralizing agent, 0.05 part by weight of silicon dioxide having an average particle diameter of 3 μm as an anti-blocking agent, and 0.10 part by weight of erucamide as a lubricant. The mixture was agitated by a Henschel mixer and extruded from an extruder at 240° C. to form pellets. The pellets had an MFR of 6.0 g/10 min. A non-oriented film was prepared at a temperature of 240° C. from the pellet with an extruder equipped with a T-die. The haze, the Young's modulus and the impact strength at punching were measured for the film thus obtained.

EXAMPLE 2 AND COMPARATIVE EXAMPLE 1

Films were prepared in the same manner as in Example 1 except that the added amount of the radical generating agent was changed.

COMPARATIVE EXAMPLE 2

A film was prepared in the same manner as in Example 1 except that no radical generating agent was added to the powdery polypropylene.

COMPARATIVE EXAMPLE 3

Powdery polypropylene was obtained in an amount of 29.3 kg by the polymerization in the same manner as in Example 1 except that titanium trichloride (manufactured by MARUBENI-SOLVAY, Japan) was used as a solid catalyst component and diethyl aluminum chloride was used as an organoaluminum compound component. The polypropylene powder had an MFR of 3.8 g/10 min. A film was prepared from the polypropylene to which a radical generating agent had been incorporated in an amount specified in Table 1 in the same manner as in Example 1.

The polypropylene prepared by the present invention is, as described above, excellent in transparency, stiffness, impact strength and resistance to blocking.

What is claimed is:

1. A highly crystalline polypropylene for forming film which is obtained by subjecting a polymer mass consisting essentially of propylene homopolymer to molecular weight degradation by kneading said polymer mass at a temperature of 170° to 300° C. in the presence of 0.001 to 2% by weight of propylene homopolymer of a radical generating agent, said propylene homopolymer subjected to molecular weight degradation having been obtained by the polymerization of propylene over a stereoregulating catalyst and which has:

(a) a melt flow rate, MRF, in the range of 1 to 10 g/10 min determined in accordance with ASTM-D-1238;
   (b) a ratio Q which is the ratio of weight average molecular weight $M_W$ to the number average molecular weight $M_N$, namely, $M_W/M_N$, in the range of 2.5 to 4.0;
   (c) a density of at least 0.9070 g/cm³; and
   (d) a cold xylene soluble matter (CXS) of at most 2.5% by weight.

2. The highly crystalline polypropylene for forming film as claimed in claim 1, wherein the stereoregulating catalyst comprises a combination of (A) a solid catalyst component comprising, as essential components, magnesium, titanium, a halogen atom and an electron donor and (B) an organoaluminum compound component.

3. The highly crystalline polypropylene for forming film as claimed in claim 2, wherein the titanium, magnesium and halogen in the solid catalyst components (A) are introduced therein, respectively, by a magnesium dihalide, by a tetravalent titanium having a halogen atom and/or an alkoxy group, and by the magnesium compound and/or the titanium compound used for introducing the magnesium and the titanium.

4. The highly crystalline polypropylene for forming film as claimed in claim 2, wherein the electron donor compound in the solid catalyst component (A) is introduced by an organic acid ester, an organic acid halide or an organic silicon compound.

5. The highly crystalline polypropylene for forming film as claimed in claim 4, wherein the organic acid for the organic acid ester or the organic acid halide is an aromatic carboxylic acid.

6. The highly crystalline polypropylene for forming film as claimed in claim 4, wherein the organosilicon compound is one having a formula of $R^1R^2{}_{3-n}Si(OR^3)_n$ wherein $R^1$ is a hydrocarbyl group having a branched chain of 3 to 12 carbon atoms or an alicyclic hydrocarbyl group of 3 to 12 carbon atoms, $R^2$ may be the same as or different from $R^1$ and is hydrocarbyl group of 3 to 12 carbon atom, $R^3$ is a hydrocarbyl group of 1 to 4 carbon atoms, and n is a number of an equation of $1 \leq n \leq 3$.

7. The highly crystalline polypropylene for forming film as claimed in claim 6, wherein the substituent $R^1$ is an aliphatic or alicyclic hydrocarbyl group of 3 to 10 carbon atoms having a branch chain at its α-position and having an α-carbon atom which is thus secondary or tertiary.

8. The highly crystalline polypropylene for forming film as claimed in claim 6, wherein the substituent $R^1$ is an aliphatic hydrocarbyl group of 4 to 10 carbon atoms having an α-carbon atom which is tertiary.

9. The highly crystalline polypropylene for forming film as claimed in claim 1, wherein the radical generating agent is an organic peroxide.

10. The highly crystalline polypropylene for forming film as claimed in claim 9, wherein the organic peroxide is selected from the group consisting of peroxides, hydroperoxides and peracids.

11. The highly crystalline polypropylene for forming film as claimed in claim 9, wherein the organic peroxide has a temperature for obtaining a half-time of 1 minute of 70° to 300° C.

12. The highly crystalline polypropylene for forming film as claimed in claim 1, wherein the MFR is 2 to 8 g/10 min.

13. The highly crystalline polypropylene for forming film as claimed in claim 1, wherein the Q value is 2.8 to 3.8.

14. The highly crystalline polypropylene for forming film as claimed in claim 1, wherein the density is 0.9070 to 0.9150 g/cm$^3$.

15. The highly crystalline polypropylene for forming film as claimed in claim 1, wherein the density is 0.9075 to 0.9150 g/cm$^3$.

* * * * *